US008773063B2

(12) United States Patent
Nakata

(10) Patent No.: US 8,773,063 B2
(45) Date of Patent: Jul. 8, 2014

(54) MOTOR DRIVE SYSTEM AND CONTROL METHOD THEREOF

(75) Inventor: Hideki Nakata, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/810,340

(22) PCT Filed: Apr. 23, 2012

(86) PCT No.: PCT/JP2012/002780

§ 371 (c)(1), (2), (4) Date: Jan. 15, 2013

(87) PCT Pub. No.: WO2013/057854

PCT Pub. Date: Apr. 25, 2013

(65) Prior Publication Data

US 2013/0141027 A1 Jun. 6, 2013

(30) Foreign Application Priority Data

Oct. 17, 2011 (JP) ................................ 2011-227803

(51) Int. Cl.
*H02P 23/00* (2006.01)

(52) U.S. Cl.
USPC ........................................... 318/798; 318/799

(58) Field of Classification Search
USPC .................. 318/798, 799, 800, 801, 802, 432
See application file for complete search history.

(56) References Cited

U.S. PATENT DOCUMENTS 4,454,574 A * 6/1984 Bush et al. .................... 363/134
4,758,117 A 7/1988 Maki et al.
4,959,602 A * 9/1990 Scott et al. .................... 318/803
5,583,406 A 12/1996 Mutoh et al.
6,172,474 B1 * 1/2001 Gotou ...................... 318/400.01
7,667,419 B2 * 2/2010 Fukamizu et al. ....... 318/400.34
2011/0029179 A1 2/2011 Miyazaki et al.
2011/0193509 A1 8/2011 Ooyama et al.

FOREIGN PATENT DOCUMENTS

CN 102148582 8/2011
EP 2 281 710 2/2011
JP 61-157269 7/1986

(Continued)

OTHER PUBLICATIONS

International Search Report issued Jul. 24, 2012 in corresponding International Application No. PCT/JP2012/002780.

(Continued)

*Primary Examiner* — Rina Duda
(74) *Attorney, Agent, or Firm* — Wenderoth, Lind & Ponack, L.L.P.

(57) ABSTRACT

A motor drive system comprising: an inverter that supplies power to a three-phase motor; and a control unit that controls switching elements of upper and lower arms included in the inverter by switching between supply control of controlling the switching elements so that alternating current is supplied to three phases of the three-phase motor and suspension control of controlling the switching elements so that the supply of current is stopped. The suspension control involves: putting and keeping, in a conduction state, a switching element of at least one upper arm each corresponding to one of one or more phases through which current flows in a direction entering the three-phase motor at a timing at which the supply of current is stopped, and putting and keeping switching elements of rest of the upper arms and switching elements of lower arms in a non-conduction state.

8 Claims, 11 Drawing Sheets

(56) References Cited

FOREIGN PATENT DOCUMENTS

| | | |
|---|---|---|
| JP | 5-153705 | 6/1993 |
| JP | 7-143611 | 6/1995 |
| JP | 7-147782 | 6/1995 |
| JP | 8-182381 | 7/1996 |
| JP | 9-56162 | 2/1997 |
| JP | 10-243680 | 9/1998 |
| JP | 2003-164009 | 6/2003 |
| JP | 2011-15515 | 1/2011 |
| JP | 2011-36008 | 2/2011 |
| JP | 2011-67043 | 3/2011 |
| JP | 2011-250671 | 12/2011 |

OTHER PUBLICATIONS

Written Opinion of the International Searching Authority issued Jul. 24, 2012 in corresponding International Application No. PCT/JP2012/002780 (with English translation).

Office Action issued Nov. 4, 2013 in corresponding Chinese Application No. 201280002083.7, with English translation.

* cited by examiner

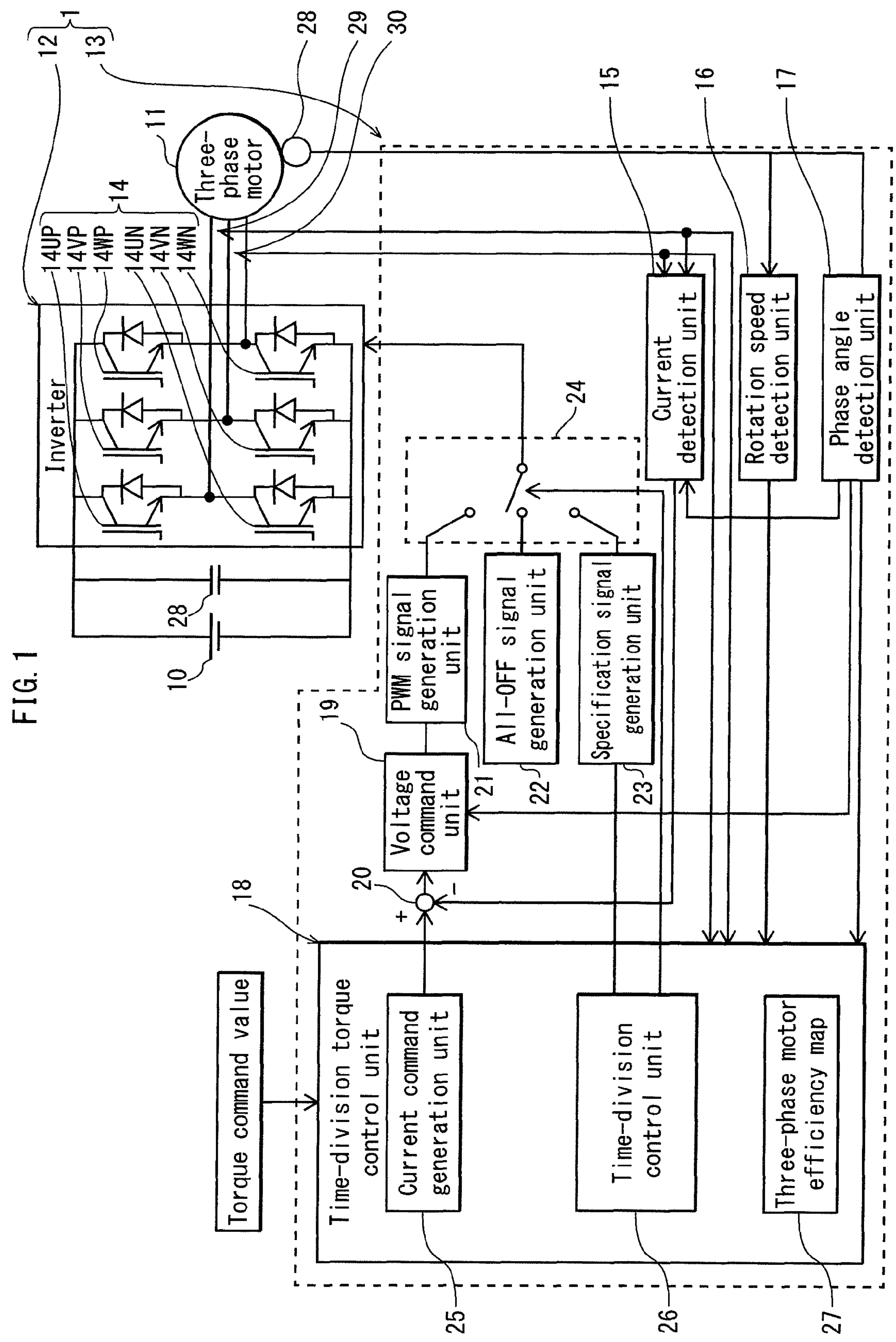
FIG. 1
Inverter
Three-phase motor
14UP
14VP
14WP
14UN
14VN
14WN
Current detection unit
Rotation speed detection unit
Phase angle detection unit
PWM signal generation unit
All-OFF signal generation unit
Specification signal generation unit
Voltage command unit
Torque command value
Time-division torque control unit
Current command generation unit
Time-division control unit
Three-phase motor efficiency map

U
14UP
V
14VP
W
14WP
11
28
14WN
14UN
14VN

U
14UP
V
14VP
W
14WP
11
28
14WN
14UN
14VN

U
14UP
V
14VP
W
14WP
11
28
14WN
14UN
14VN

| Section | 14UP | 14UN | 14VP | 14VN | 14WP | 14WN |
|---|---|---|---|---|---|---|
| ① | — | — | ON | — | ON | — |
| ② | — | — | — | — | ON | — |
| ③ | ON | — | — | — | ON | — |
| ④ | ON | — | — | — | — | — |
| ⑤ | ON | — | ON | — | — | — |
| ⑥ | — | — | ON | — | — | — |

MOTOR DRIVE SYSTEM AND CONTROL METHOD THEREOF

TECHNICAL FIELD

The present invention relates to a motor drive system that is provided with an inverter for driving a motor and a control unit.

BACKGROUND ART

In recent years, electric vehicles driven by electric motors are gaining popularity. An electric vehicle is equipped with a motor that is capable of generating drive torque for driving the vehicle, and includes an inverter that generates three-phase alternating current to be supplied to the motor and a control unit that controls the inverter. When performing control of the motor, it is important to increase the efficiency with which the motor is driven in order to reduce electric energy consumption of the motor as much as possible.

FIG. 10 illustrates a correlation between a rotation speed of a conventional motor, torque generated by the motor, and energy efficiency of the motor. As can be seen from FIG. 10, the energy efficiency of the motor changes depending upon both the rotation speed of the motor and the torque generated by the motor. In other words, even when the rotation speed of the motor does not change, the energy efficiency of the motor changes when the torque generated by the motor changes. In relation to this, conventional technology discloses a motor drive system that drives a motor intermittently at a drive point realizing high energy efficiency, thereby realizing a reduction in average energy loss of the motor and an increase in overall energy efficiency of the motor (e.g., Patent Literature 1).

FIG. 11 is a timing chart indicating a chronological change in torque generated by the motor when the motor drive technology disclosed in Patent Literature 1 is applied.

As can be seen from FIG. 11, within a period of a powering state where drive torque needs to be generated by the electric motor, a control unit sets, in alternation, a first drive period and a second drive period. The first drive period is a period during which the electric motor is driven according to a first drive torque command value that indicates a smaller torque value than a demanded torque value. On the other hand, the second drive period is a period during which the electric motor is driven according to a second drive torque command value that indicates a larger torque value than the demanded torque value. Here, the demanded torque value is a torque value that is determined according to the direction of an accelerator. By the first drive period and the second drive period being set in alternation during the period of the powering state as described above, the electric motor alternates between a state where three-phase alternating current is supplied thereto and a state where three-phase alternating current is not supplied thereto. Accordingly, torque is generated intermittently by the electric motor. Further, an average value of the first drive torque and the second drive torque generated by the electric motor during the period of the powering state is within a predetermined error range of the demanded torque value. Here, the energy efficiency of the electric motor, when driven according to the second drive torque command value, is set so as to indicate a higher value than the energy efficiency of the electric motor, when driven according to the demanded torque value.

By driving the electric motor in such a manner, the overall energy efficiency of the electric motor, when averaging the first drive torque and the second drive torque during the period of the powering state, is higher than the energy efficiency of the electric motor when the electric motor continuously outputs the demanded torque in accordance with the direction of the accelerator. As such, by setting two drive torque command values as described above, and further, by changing the torque generated by the electric motor by performing alternate switching between the two drive torque command values as illustrated in FIG. 11, the overall energy efficiency of the electric motor during the period of the powering state is improved while it is ensured that the torque generated by the electric motor equals the demanded torque without excess or deficiency.

In the meantime, electric vehicles are not only expected to reduce electrical power consumption, but also expected to provide, to its passengers, a comfortable ride. In relation to this, Patent Literature 1 discloses a technology of setting the first drive period and the second drive period during the period of the powering state such that a frequency at which the alternate switching between the first torque command value and the second torque command value is performed during the period of the powering state is sufficiently high compared to a natural frequency of a drive system. More specifically, according to Patent Literature 1, it is desirable that the frequency for alternate switching between the two torque command values be set to, for instance, a frequency around 100 Hz or higher. Commonly, a natural frequency of a drive system of an electric vehicle is around several Hz. As such, by setting the frequency for alternate switching between the two torque command values to around 100 Hz or higher, vibration of a chassis of an electric vehicle, etc., that takes place as a result of torque generated by a motor changing can be suppressed. Consequently, a comfortable ride can be realized. Note that here, the term "drive system" refers to an entirety of a device for transmitting torque generated by a motor to wheels of an electric vehicle.

CITATION LIST

Patent Literature

[Patent Literature 1]
Japanese Patent Application Publication No. 10-243680

SUMMARY OF INVENTION

Technical Problem

In the meantime, according to the conventional motor drive system described above, alternating current is intermittently supplied to three phases of a three-phase motor, thereby causing the three-phase motor to generate torque intermittently at a frequency equal to or higher than 100 Hz. When the intermittent supply of alternating current to the three phases of the three-phase motor is performed, current flows from the three-phase motor to a power supply connected to the three-phase motor within the period during which the supply of alternating current to the three phases is suspended. The flow of current in such a manner is hereinafter referred to as "regeneration of current". For instance, in a case where a capacitor is connected in parallel with the power supply, current flows into the capacitor when the regeneration of current occurs, and the capacitor is caused to expand. Subsequently, when current flows out from the capacitor, the capacitor contracts. When such expansion and contraction of the capacitor are repeated, the capacitor vibrates and thereby generates noise. This is problematic, since, particularly, when running noise generated by an electric vehicle is relatively small due to reasons such as the electric vehicle running at low speed, there is a risk of the noise generated by the capacitor being offensive to the ears of passengers on-board the electrical vehicle.

In view of the problems described above, the present invention provides a motor drive system that, even when causing a motor to generate torque intermittently at a low frequency, reduces the risk of noise being generated by a capacitor.

Solution to the Problems

One aspect of the present invention is a motor drive system comprising: an inverter that supplies power to a three-phase motor by supplying alternating current to three phases of the three-phase motor, the inverter including at least three upper arms and at least three lower arms, each of the at least three upper arms and each of the at least three lower arms including a switching element and a freewheeling diode that are connected in parallel; and a control unit that performs control of the switching elements included in the inverter by switching between (i) supply control of controlling the switching elements so as to cause the inverter to supply alternating current to the three phases and (ii) suspension control of controlling the switching elements so as to cause the inverter to stop the supply of alternating current to the three phases, wherein the control unit switches from the supply control to the suspension control at a timing at which the supply of alternating current to the three phases is to be stopped, and the suspension control is control of: putting and keeping, in a conduction state, a switching element of at least one upper arm, among the at least three upper arms, each corresponding to one of one or more phases through which alternating current flows in a direction entering the three-phase motor at the timing at which the supply of alternating current to the three phases is to be stopped, and putting and keeping the rest of the switching elements included in the inverter in a non-conduction state.

Advantageous Effects of the Invention

According to the above-described structure of the motor drive system pertaining to one aspect of the present invention, even when causing the motor to generate torque intermittently at a low frequency, the risk is reduced of noise being generated by the capacitor.

BRIEF DESCRIPTION OF THE DRAWINGS

FIG. 1 is a block diagram indicating a structure of a motor drive system pertaining to an embodiment.

DESCRIPTION OF EMBODIMENTS

Figure 2A:
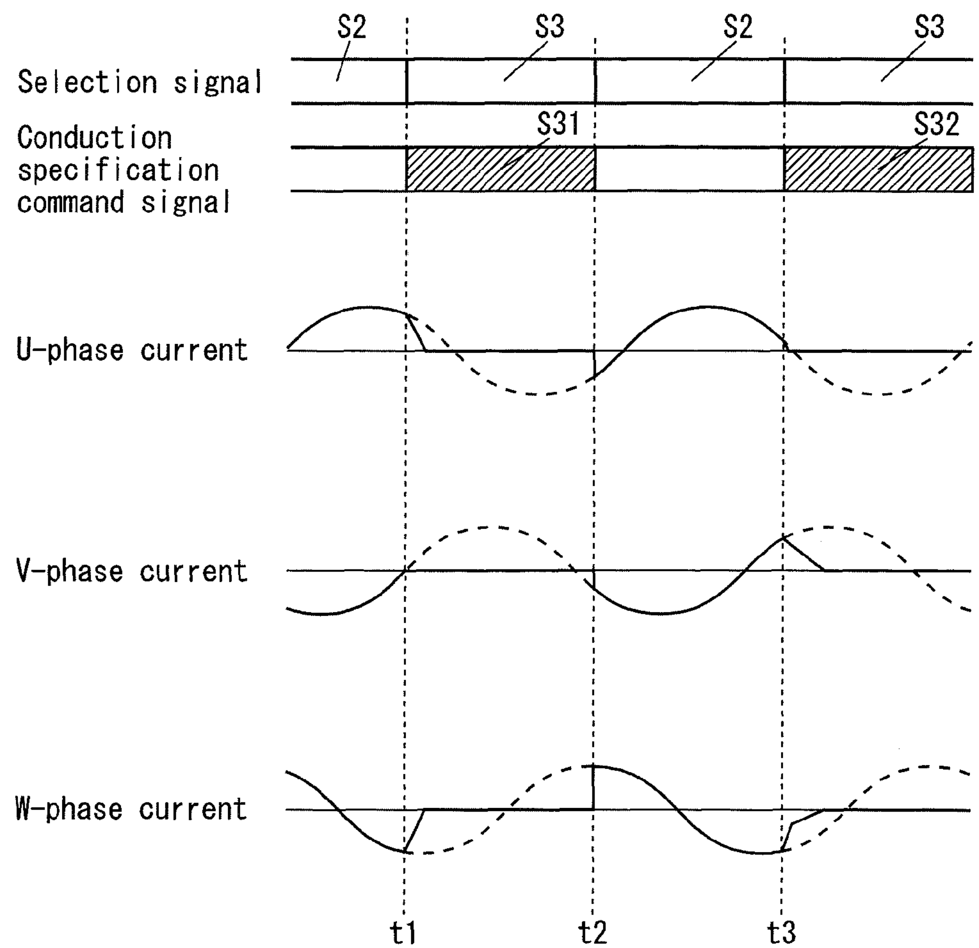
FIG. 2A is a waveform diagram illustrating one example of a selection signal and motor currents during time-division control.

By causing a motor to generate torque intermittently at a low frequency, the noise generated by a capacitor can be made similar to a low frequency noise similar to vibration noise generated by an engine in a vehicle including a motor and a supplementary engine and running noise of the vehicle. By causing the motor to generate torque in such a manner, the noise generated by the capacitor can be concealed by the running noise of the vehicle, etc., and hence, can be prevented from being offensive to ears of passengers on-board the vehicle. However, when setting the frequency at which the torque generated by the motor changes to a low frequency and setting the frequency at which three-phase alternating current is supplied to a frequency close to a natural frequency of a drive system in order so as to lower a pitch of the noise generated by the capacitor, a frequency of vibration of the capacitor also approaches the natural frequency of the drive system. When the frequency of vibration of the capacitor approaches the natural frequency of the drive system, a problematic situation arises where vibration of the drive system is amplified, and as a result, the risk of vibration of the drive system increases.

In addition, when current flowing out from the motor flows into the capacitor due to the regeneration of current, the motor enters a regenerative state where the rotation speed of the motor drops and braking of the motor takes place. By generation of torque by the motor and braking of the motor taking place intermittently at a low frequency, the risk of vibration is increased to a further extent.

When applying a common method of suspending supply of alternating current to three phases of a three-phase motor by putting all switching elements in a non-conduction state, current flowing out from the three-phase motor flows towards a power source via a diode of an upper arm corresponding to a phase of the three-phase motor from which current flows out. As such, the regeneration of current takes place. In contrast, when the supply of alternating current to the three phases is suspended according to the suspension control in the above-described structure of the motor drive system pertaining to one aspect of the present invention, at least a portion of current flowing out from the motor (i) flows through a diode of an upper arm corresponding to a phase, among the three phases, from which current flows out, (ii) flows through a switching element, in the conduction state, of at least one upper arm each corresponding to one of one or more other phases among the three phases, and (iii) returns to the motor. In such a case, a current return path is formed by (i) a motor coil and a diode corresponding to one phase among the three phases and (ii) a switching element and a motor coil of at least one of one or more other phases, among the three phases, through which current flows in a direction entering the three-phase motor upon suspension of the supply of alternating current to the three phases. When current flows through the current return path along which the regeneration of current does not take place, current flowing through a path bringing about the regeneration of current is reduced. Accordingly, rapid regeneration of current is suppressed. Here, note that current flowing into the current return path is consumed by resistance of the three-phase motor and resistance of conducting wires, and due to this, drops to zero following elapse of a certain amount of time.

When the rapid regeneration of current is suppressed, for instance, current flowing into a capacitor provided to an inverter is reduced, and accordingly, vibration of the capacitor is suppressed. As such, even when the frequency of vibration of the capacitor and the frequency of vibration of the drive system are close to each other, the risk of vibration of the drive system being amplified is reduced, and accordingly, the risk of vibration of the drive system is reduced. In addition, the generation of noise by the capacitor vibrating is suppressed as well.

As such, a motor drive system is provided that, even when causing the motor to generate torque intermittently at a low frequency, reduces the risk of noise being generated by the capacitor.

Further, by the rapid regeneration of current being suppressed, vibration generated by braking taking place due to the motor being put in the regenerative state is suppressed.

In the following, description is provided on a motor drive system that is one exemplary implementation of the present invention, with reference to the accompanying drawings.

Embodiment

1. Overall Structure

FIG. 1 is a block diagram indicating a structure of a motor drive system 1 pertaining to an embodiment.

As illustrated in FIG. 1, the motor drive system 1 is composed of an inverter 12 and a control unit 13.

The inverter 12 includes a three-phase bridge circuit composed of: a U-phase upper arm including a switching element 14UP and a freewheeling diode; a U-phase lower arm including a switching element 14UN and a freewheeling diode; a V-phase upper arm including a switching element 14VP and a freewheeling diode; a V-phase lower arm including a switching element 14VN and a freewheeling diode; a W-phase upper arm including a switching element 14WP and a freewheeling diode; and a W-phase lower arm including a switching element 14WN and a freewheeling diode. Note that the switching elements 14UP through 14WN are referred to as "switching elements 14" unless when it is necessary to distinguish the switching elements one from another. Each of the switching elements 14 is connected in parallel with a corresponding freewheeling diode. Each of the switching elements 14 may be implemented, for instance, by using an IGBT (Insulated Gate Bipolar Transistor) or a MOSFET (Metal Oxide Semiconductor Field Effect Transistor). The IGBT and the MOSFET may each be a switching element made from silicon (Si) or a switching element made from silicon carbide (SiC). During a powering state of the motor drive system 1, the inverter 12 performs DC/AC conversion on direct current power output from a power source 10 and supplies alternating current power to a motor 11. In contrast, during a regenerative state of the motor drive system 1, the inverter 12 converts alternating current power generated by the three-phase motor 11 into direct current power and supplies direct current power to the power source 10.

The power source 10 may be implemented, for instance, by using a rechargeable battery such as a lithium ion battery and a nickel-metal hydride battery. Further, a capacitance element 28, such as a capacitor, is connected in parallel with the power source 10.

The motor 11 is a three-phase motor that is connected with the inverter 12 and that functions as a power source of an electric vehicle. The three-phase motor 11 may be implemented, for instance, by using an interior permanent magnet synchronous motor or a surface magnet type synchronous motor having magnets disposed on a surface thereof.

2. Detailed Structure of Control Unit 13

The control unit 13 includes; a current detection unit 15; a rotation speed detection unit 16; a phase angle detection unit 17; a time-division torque control unit 18; a comparison unit 20; a voltage command unit 19; an all-OFF signal generation unit 22; a PWM signal generation unit 21; a specification signal generation unit 23; a selector 24; a motor sensor 28; and current detection sensors 29 and 30. The motor sensor 28 may be implemented, for instance, by using a resolver, a rotary encoder, or a sensor using Hall effect.

The current detection unit 15 detects currents of at least two of a U-phase, a V-phase, and a W-phase of the three-phase motor 11. Further, the current detection unit 15 performs dq conversion by using the detected currents and a rotation phase angle of the three-phase motor 11 detected by the phase angle detection unit 17. Detailed description on the phase angle detection unit 17 is provided in the following. A d-axis current and a q-axis current yielded as a result of the dq conversion are output to the comparison unit 20.

The rotation speed detection unit 16 detects the rotation speed of the three-phase motor 11 by detecting the number of rotations of a rotor of the three-phase motor 11 per unit time period by utilizing the motor sensor 28 provided to the three-phase motor 11, and outputs the rotation speed to the time-division torque control unit 18. By detecting the number of rotations of the rotor per unit time period, the actual rotation speed of the three-phase motor 11 can be detected.

The phase angle detection unit 17 detects a rotation phase angle of the rotor of the three-phase motor 11 by utilizing the motor sensor 28 provided to the three-phase motor 11, and outputs the rotation phase angle of the rotor to each of the current detection unit 15, the voltage command unit 19, and the time-division torque control unit 18.

The time-division torque control unit 18 includes a current command generation unit 25, a time-division control unit 26, and a three-phase motor efficiency map 27. The time-division torque control unit 18 determines an appropriate control method according to which the inverter 12 is to be operated in accordance with a torque command value, currents of the three phases of the three-phase motor 11, the rotation speed of the three-phase motor 11, and the rotation phase angle of the three-phase motor 11. In specific, the time-division torque control unit 18 determines which control is to be performed among (i) a time-division control according to which switching between supply of three-phase alternating current to the three-phase motor 11 and suspension of the supply of current to the three-phase motor 11 is repeatedly performed and (ii) a normal control according to which the supply of alternating current to the three-phase motor 11 is continuously performed. The determination is performed by the time-division torque control unit 18 comparing energy efficiency of the three-phase motor 11 when the time-division control is performed and energy efficiency of the three-phase motor 11 when the normal control is performed. The time-division torque control unit 18 performs the comparison by using, for instance, a demanded torque based on the torque command value, the rotation speed obtained by the rotation speed detection unit 16, and the three-phase motor efficiency map 27.

When the time-division control is performed, the current command generation unit 25 refers to the three-phase motor efficiency map 27, calculates a maximum efficiency torque realizing maximum energy efficiency of the three-phase motor 11 at the present rotation speed by using the three-phase motor efficiency map 27, and generates a d-axis current command and a q-axis current command in accordance with the maximum efficiency torque. Here, note that the torque according to which the current commands are generated (hereinafter referred to as a "command torque") is not limited to the maximum efficiency torque, and may be any torque provided that the torque is larger than the demanded torque. In contrast, when the normal control is performed, the current command generation unit 25 generates the d-axis current and the q-axis current in accordance with the demanded torque.

The time-division control unit 26 generates a selection signal for controlling the selector 24 and a conduction specification command signal for controlling the specification signal generation unit 23. Description on the methods for generating the selection signal and the conduction specification command signal is provided in the following.

Figure 10:
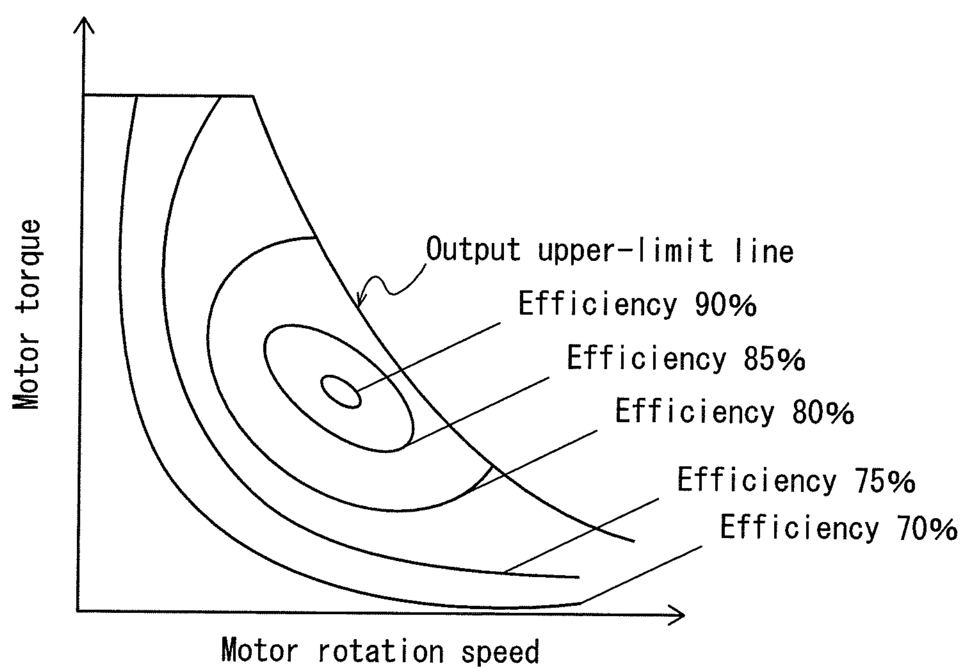
FIG. 10 is a diagram illustrating a correlation between a rotation speed of a motor, torque generated by the motor, and motor efficiency of the motor.
Figure 11:
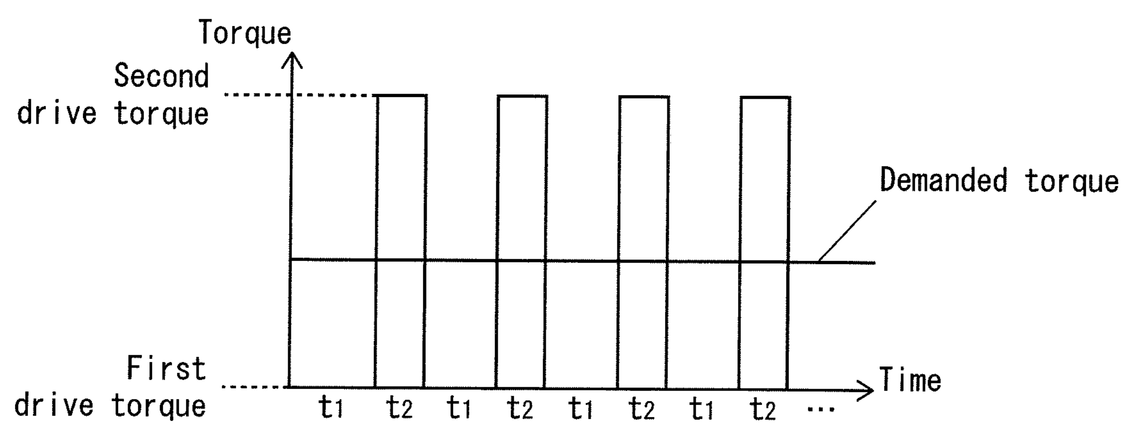
FIG. 11 is a timing chart indicating a chronological change in torque in a conventional motor drive technology disclosed in Patent Literature 1.

The three-phase motor efficiency map 27 is information in the form of a map indicating the correlation between a rotation speed of a motor, torque of the motor, and efficiency of the motor as illustrated in FIG. 10.

The comparison unit 20, for each of the d-axis and the q-axis, compares the corresponding current value output by the current detection unit 15 and the corresponding current command value obtained from the current command generation unit 25, calculates a current error between the current value and the current command value, and outputs the current error to the voltage command unit 19. The current values output by the current detection unit 15 are obtained by sampling performed at the current detection sensors 29 and 30. In specific, the comparison unit 20 outputs each of (i) a current error calculated by comparison of the d-axis current command value and the d-axis current value and (ii) a current error calculated by comparison of the q-axis current command value and the q-axis current value to the voltage command unit 19. Note that the current errors calculated by the comparison unit 20 indicate a difference between current actually being supplied to the three-phase motor 11 and current required for realizing drive of the three-phase motor 11 as desired by a user.

The voltage command unit 19 calculates voltage command values according to the current errors output from the comparison unit 20. In specific, the voltage command unit 19 performs PI control (proportional integration control) on the d-axis current error and the q-axis current error so as to respectively calculate a d-axis voltage command value and a q-axis voltage command value. Further, the voltage command unit 19 performs inverse dq conversion by using the combination of the d-axis voltage command value and the q-axis voltage command value, and the rotation phase angle of the three-phase motor 11, calculates a voltage command value for each of the U-phase, the V-phase, and the W-phase of the three-phase motor 11, and outputs the voltage command values to the PWM signal generation unit 21.

The all-OFF signal generation unit 22 generates, for each of the U-phase, the V-phase, and the W-phase, a signal that puts corresponding switching elements 14 in the non-conduction state (e.g., a signal having low level), and outputs the signals to the selector 24.

The PWM signal generation unit 21 generates, for each of the U-phase, the V-phase, and the W-phase, a signal causing the corresponding switching elements 14 to repeatedly switch between the conduction state and the non-conduction state according to PWM (Pulse Width Modulation) control (e.g., a signal alternating between high level and low level) in accordance with the voltage command values, and outputs the signals to the selector 24.

The specification signal generation unit 23 generates, according to the conduction specification command signal output from the time-division control unit 26, signals that put and keep specific ones of the switching elements 14 in the conduction state while putting and keeping the rest of the switching elements 14 in the non-conduction state (for instance, a signal having high level is generated for each of the specific ones of the switching element 14 while a signal having low level is generated for each of the rest of the switching elements 14), and outputs the signals to the selector 24.

The selector 24, according to the selection signal output from the time-division control unit 26, makes a selection from (i) the signals output from the all-OFF signal generation unit 22, (ii) the signals output from the PWM signal generation unit 21, and (iii) the signals output from the specification signal generation unit 23, and outputs the selected signals to the inverter 12.

The control unit 13 may be implemented, for instance, by using a single processor or by using a combination of multiple processors. In specific, a microcomputer, a DSP (Digital Signal Processor), an FPGA (Field Programmable Gate Array), or a dedicated IC (Integrated Circuit) may be used as a processor for implementing the control unit 13. Note that the control unit 13 may also be implemented without using such processors.

3. Operations

In the following, description is provided on operations of the motor drive system 1 during the time-division control, while referring to waveforms of the currents of the U-phase, the V-phase, and the W-phase of the three-phase motor 11. Note that hereinafter, the currents of the three phases of the three-phase motor 11 may also be collectively referred to as "motor currents".

Figure 2B:
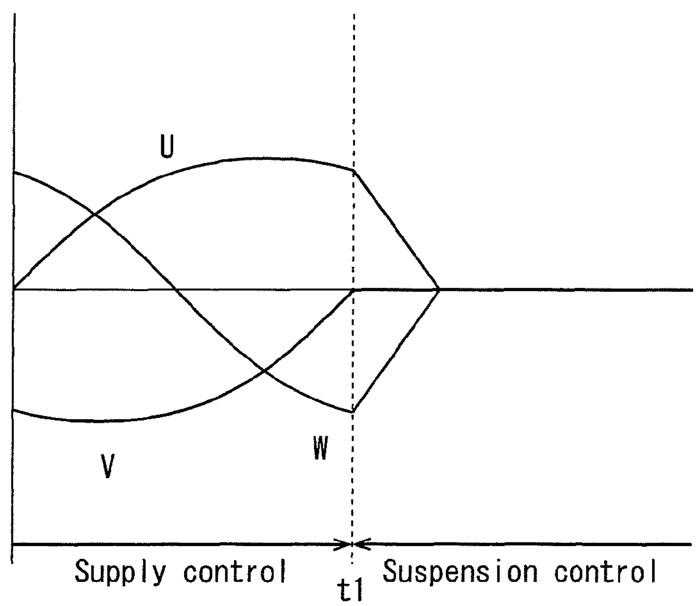
FIG. 2B is an enlarged view of a portion of FIG. 2A.

FIG. 2A is a waveform diagram illustrating one example of the selection signal and the motor currents during time-division control, and FIG. 2B is an enlarged view of a portion of FIG. 2A.

At a given time point, the selection signal is in one of a first state, a second state, and a third state, description on which is provided in the following. When the selection signal is in the first state, referred to as state S1, the selector 24 selects the all-OFF signal generation unit 22. When the selection signal is in the second state, referred to as state S2, the selector 24 selects the PWM signal generation unit 21. When the selection signal is in the third state, referred to as state S3, the selector 24 selects the specification signal generation unit 23. In the present disclosure, the control performed when state S1 is selected as the state of the selection signal is also referred to as "non-conduction control".

The conduction specification command signal indicates which ones of the switching elements 14UP, 14VP, 14WP, 14UN, 14VN, and 14WN are to be put in the conduction state when the selection signal is in state S3.

In FIG. 2A, the selection signal indicates state S2 until time point t1. As such, during this period, the selector 24 outputs the signals output from the PWM signal generation unit 21 to the inverter 12. Due to this, the switching elements 14 repeatedly switch between the conduction state and the non-conduction state in accordance with PWM control until during this period, and as a result, three-phase alternating current is output to the three-phase motor 11 from the inverter 12 during this period. In the present disclosure, the control performed during such a period as described above is also referred to as "supply control".

Between time point t1 and time point t2, the selection signal indicates state S3. As such, during this period, the selector 24 outputs the signals output from the specification signal generation unit 23 to the inverter 12. Due to this, specific ones of the switching elements 14 are put and kept in the conduction state during this period while the rest of the switching elements 14 are put and kept in the non-conduction state during this period. The switching elements 14 to be put and kept in the conduction state during this period are specified according to state S31 of the conduction specification command signal. Here, it is presumed that state S31 of the conduction specification command signal indicates that the switching element 14UP of the U-phase upper arm is to be put and kept in the conduction state while the rest of the switching elements 14, namely the switching elements 14VP and 14WP of the upper arm and the switching elements 14UN, 14VN, and 14WN of the lower arm, are to be put and kept in the non-conduction state. Due to this, between time point t1 and time point t2, the switching element 14UP is put and kept in the conduction state, whereas the rest of the switching elements 14, namely the switching elements 14UN, 14VP, 14VN, 14WP, and 14WN, are put and kept in the non-conduction state. As such, between time point t1 and time point t2, a current in a direction entering the three-phase motor 11 flows through the U-phase and a current in a direction exiting the three-phase motor 11 flows through the W-phase. Further, as illustrated in FIG. 2B, the current of the U-phase and the current of the W-phase commonly decrease as time elapses from time point t1. In the present disclosure, the control performed during such a period as described above is also referred to as "suspension control".

Between time point t2 and time point t3, the selection signal indicates state S2. Due to this, during this period, the switching elements 14 repeatedly switch between the conduction state and the non-conduction state in accordance with PWM control, and as a result, three-phase alternating current is output to the three-phase motor 11 from the inverter 12. Following time point t3, basically the same operations as described above are repeated. In specific, the only difference between the operations described above and the operations following time point t3 is the difference in the switching elements 14 indicated by the conduction specification command signal. Here, note that the length of the period between time point t2 and time point t3 is determined according to the method described in the following.

First, the time-division control unit 26 determines a duty ratio according to a ratio between the maximum efficiency torque and the demanded torque. As description has been provided above, the maximum efficiency torque is a torque realizing maximum energy efficiency of the three-phase motor 11. In specific, the duty ratio is determined according to the expression: duty ratio=demanded torque/maximum efficiency torque. In addition, the duty ratio is a ratio determined according to the expression: duty ratio=conduction time/(conduction time+non-conduction time). Here, "conduction time" indicates a period during which the supply of three-phase alternating current to the three-phase motor 11 is performed, and "non-conduction" time indicates a period during which the supply of current to the three-phase motor 11 is suspended. Note that, when a command torque other than the maximum efficiency torque is utilized, the duty ratio is to be determined by using the expression: duty ratio=demanded torque/command torque.

Subsequently, the time-division control unit 26 determines the conduction time according to a total of a length of the conduction time and a length of the non-conduction time, and the duty ratio. The conduction time is determined according to the expression: conduction time=duty ratio×(conduction time+non-conduction time). In the present embodiment, it is presumed that the total length of the conduction time and the non-conduction time is fixed, and therefore is indicated by a fixed value.

Subsequently, the time-division control unit 26 sets the conduction time having been determined as the length of the period between time point t2 and time point t3. By setting the length of the period between time point t2 and time point t3 in such a manner, the average torque generated by the three-phase motor 11 during the period approaches the demanded torque.

Note that the control unit 13 may be configured to perform control other than the supply control, the suspension control, and the non-conduction control. For instance, the control unit 13 may switch to a different type of control between the supply control and the suspension control. In such a case, for instance, another signal generation unit may be provided, and the time-division control unit 26 may be configured to output a selection signal selecting the other signal generation unit to the selector 24.

4. Method for Generating Selection Signal

The time-division control unit 26 internally generates a pulse signal that rises at constant intervals, and determines a timing at which the supply of three-phase alternating current to the three-phase motor 11 is to be commenced by using a timing at which the pulse signal indicates a rise as a barometer for making the determination.

Detailed description is provided on operations of the control unit 13 when performing switching from the supply control to the suspension control and when performing switching from the supply control to the non-conduction control, with reference to FIGS. 3A and 3B and FIGS. 4A and 4B.

Figure 3A:
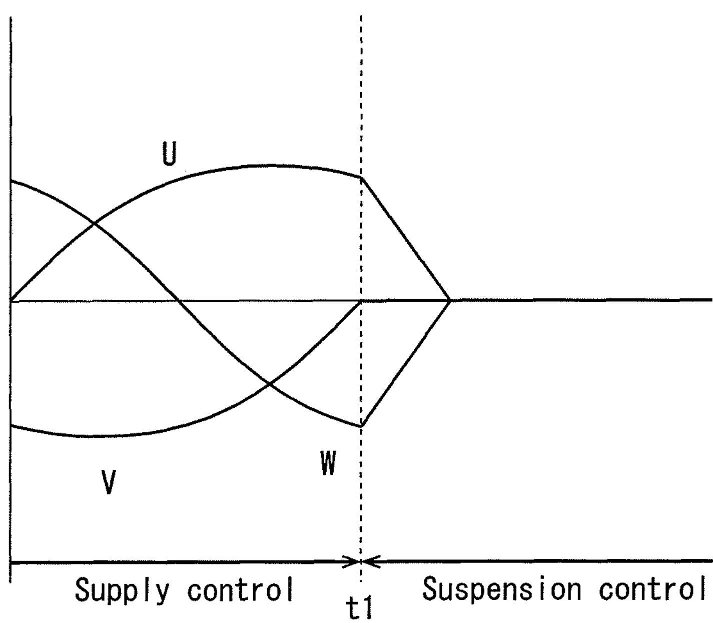
FIG. 3A is a waveform diagram illustrating a chronological change in motor current waveforms when switching is performed from supply control to suspension control in the embodiment.
Figure 3B:
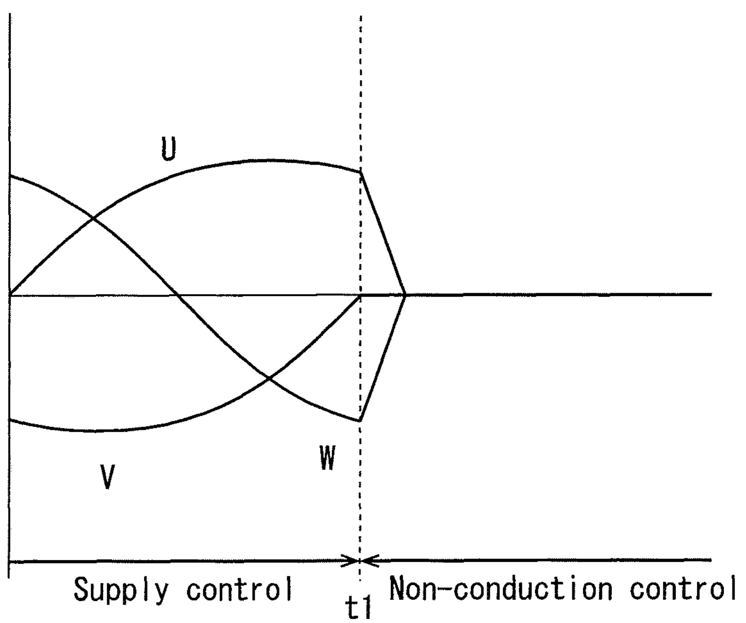
FIG. 3B is a waveform diagram illustrating a chronological change in motor current waveforms when switching is performed from the supply control to non-conduction control in a comparative example.
Figure 4A:
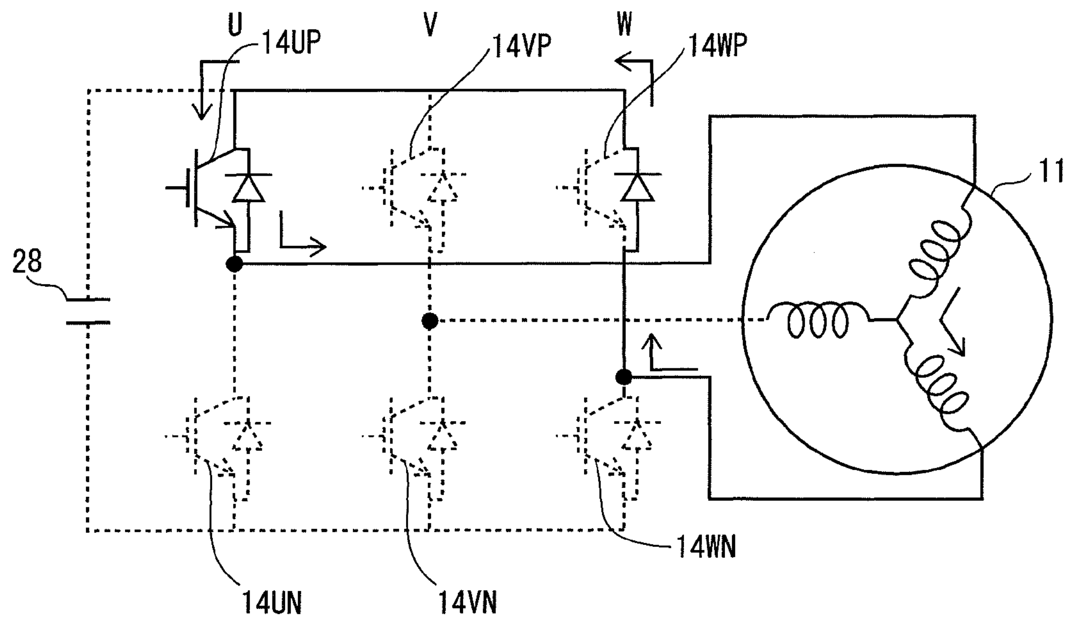
FIG. 4A is a circuit diagram illustrating a conduction state of an inverter during the suspension control in the embodiment.
Figure 4B:
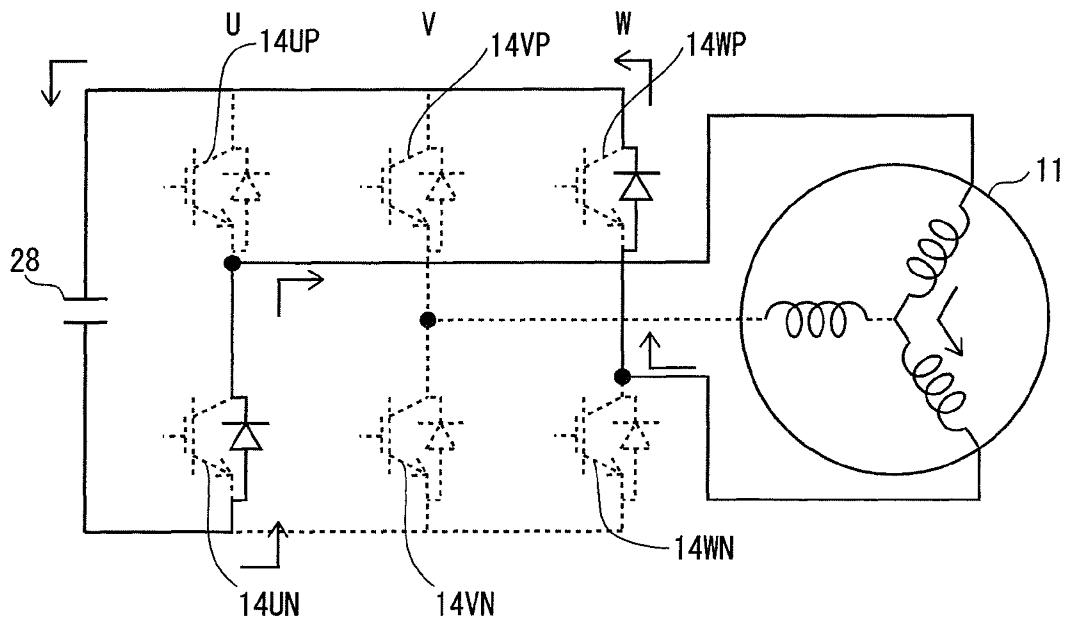
FIG. 4B is a circuit diagram illustrating a conduction state of the inverter during the non-conduction control in the comparative example.

FIG. 3A is a waveform diagram illustrating a chronological change in motor current waveforms when switching is performed from the supply control to the suspension control in the embodiment, and FIG. 3B is a waveform diagram illustrating a chronological change in motor current waveforms when switching is performed from the supply control to the non-conduction control in a comparative example. FIG. 4A is a circuit diagram illustrating a conduction state of the inverter 12 during the suspension control in the embodiment, and FIG. 4B is a circuit diagram illustrating a conduction state of the inverter 12 during the non-conduction control in the comparative example. Note that the magnitude of the current of the U-phase and the current of the W-phase is dependent upon the maximum efficiency torque. Further, the torque generated by the three-phase motor 11 is substantially proportional to the magnitude of current flowing out from the three-phase motor 11.

During the supply control, current flows through each of the U-phase, the V-phase, and the W-phase in accordance with the demanded torque to be generated by the three-phase motor 11. Here, the switching from the supply control to the suspension control is performed at a timing at which a current of one of the three phases, namely the U-phase, the V-phase, or the W-phase, equals substantially 0 A, as indicated in FIG. 3A. The rotation phase angle of the three-phase motor 11 equals a rotation phase angle corresponding to the timing at which a current of one of the three phases equals substantially 0 A six times within an electrical angle of 360°, or that is, for every 60°. In other words, the timing at which a current of one of the three phases equals substantially 0 A occurs six times within an electrical angle of 360°. The same control is performed with respect to the switching elements 14 at each of the timings at which a current of one of the three phases equals substantially 0 A.

As illustrated in FIG. 3A, at time point t1, when switching from the supply control to the suspension control is performed, the current of the U-phase indicates a positive value, whereas the current of the W-phase indicates a negative value (in the present embodiment, a positive value of a current indicates a direction entering the three-phase motor 11, whereas a negative value of a current indicates a direction exiting the three-phase motor 11). In correspondence with such a condition, at the timing at which switching from the supply control to the suspension control is performed, the time-division control unit 26 causes the selector 24 to output the signals from the specification signal generation unit 23 to the switching elements 14. In addition, at the above-described timing, the time-division control unit 26 outputs a signal to the specification signal generation unit 23 such that the switching element 14UP of the U-phase upper arm is put and kept in the conduction state and the rest of the switching elements 14, namely the switching elements 14VP, 14WP, 14UN, 14VN, and 14WN are put and kept in the non-conduction state. As a result, a current return path is formed by the diode of the W-phase upper arm, the switching element of the U-phase upper arm, a motor coil of the U-phase, and a motor coil of the W-phase, and current does not flow into the capacitor 28 (i.e., current does not flow to the side of the power source 10).

Which of the switching elements 14 is put in the conduction state at time point t1, when switching is performed from the supply control to the suspension control, depends upon the directions of the currents of the three phases of the three-phase motor 11 at time point t1. In specific, a switching element 14 of an upper arm corresponding to a phase through which current flows in the direction entering the three-phase motor 11 at time point t1 is put in the conduction state. For instance, when the current of the V-phase indicates a positive value at time point t1, the switching element 14VP of the V-phase upper arm is put in the conduction state. In contrast, when the current of the W phase indicates a negative value at time point t1, the switching element 14WP of the W-phase upper arm is put in the conduction state.

Until switching to the supply control once again from the suspension control, the switching elements 14 are kept in the same state. At the timing at which switching to the supply control from the suspension control is performed, the time-division control unit 26 causes the selector 24 to output the signals from the PWM signal generation unit 21 to the switching elements 14.

Note that FIG. 1 illustrates a structure where calculation of motor current values is performed by detecting currents of two of the U-phase, the V-phase, and the W-phase. Note that such a structure is employed since a total of current values of the three phases equals 0 A. However, the present embodiment is not limited to this. That is, a structure may be employed where the current values of the three phases are input to the time-division torque control unit 18, where direct detection of the motor current values is performed.

On the other hand, description is provided in the following on operations performed when switching from the supply control to the non-conduction control is performed in the comparative example, with reference to FIG. 3B and FIG. 4B. As illustrated in FIG. 3B, in the comparative example, at time point t1 at which switching from the supply control to the non-conduction state is performed, the current of the U-phase indicates a positive value, and the current of the W-phase indicates a negative value. At time point t1, the time-division control unit 26 outputs the selection signal to the selector 24 and thereby causes the signals from the all-OFF signal generation unit 22 to be output to the switching elements 14, as illustrated in FIG. 3B. Accordingly, all of the switching elements 14 are put in the non-conduction state at time point t1. When all of the switching elements 14 are put in the non-conduction state at time point t1, a regeneration path is formed by the diode of the W-phase upper arm, the capacitor, the diode of the U-phase lower arm, the motor coil of the U-phase, and the motor coil of the W-phase. As such, current flows into the capacitor 28, and as a result, the three-phase motor 11 enters the regenerative state.

Similar as in the case where switching is performed once again to the supply control from the suspension control, until switching is performed once again to the supply control from the non-conduction control, the switching elements 14 are kept in the same state. Control following this point is also similar as in the case where switching is performed once again to the supply control from the suspension control.

When the suspension control is performed, energy generated by the three-phase motor 11 is not collected by the capacitor 28. As such, current continues to flow out from the three-phase motor 11 for a relatively long period of time, and the three-phase motor is in a weak regenerative state where weak braking force is applied. In contrast, when the non-conduction control is performed, the current flowing out from the three-phase motor 11 flows into the capacitor 28, which is provided at an input side of the inverter 12. Accordingly, when the non-conduction control is performed, current continues to flow out from the three-phase motor 11 for a shorter period of time compared to when the suspension control is performed, and the energy generated by the three-phase motor 11 is collected by the capacitor 28. As such, while current is flowing out from the three-phase motor 11, the three-phase motor 11 is in a strong regenerative state, where strong braking force is applied. As such, selection can be made between the two regenerative states of the three-phase motor 11 having different levels of strength by switching from the supply control to either the suspension control or the non-conduction control.

Note that, although the current value of the V-phase at time point t1 is zero in the example illustrated in FIG. 3A, this situation is brought about by mere coincidence. That is, there may also be cases where none of the current values of the three phases is zero at the timing at which the supply of current to the three-phase motor 11 is suspended. For instance, at time point t3 illustrated in FIG. 2A, none of the current values of the U-phase, the V-phase, and the W-phase is zero. In the following, description is provided on such cases.

Figure 6A:
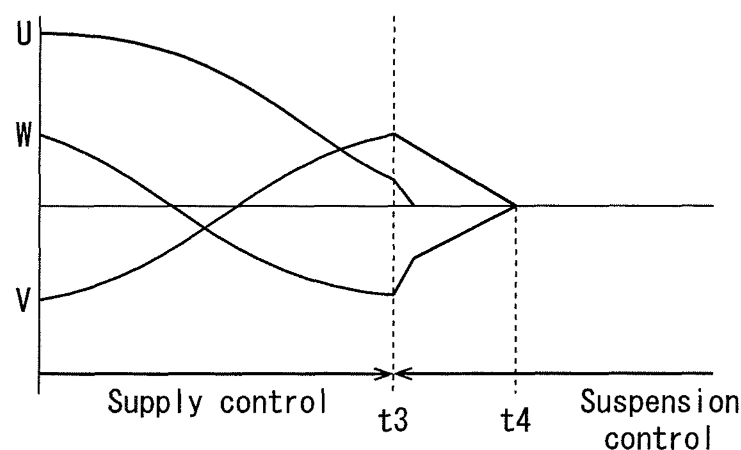
FIG. 6A is a waveform diagram illustrating a chronological change in motor current waveforms when a switching element of an upper arm corresponding to one phase is put in the conduction state in the embodiment, and FIG. 6B indicates signals output to the switching elements for yielding the waveforms in FIG. 6A.
Figure 6B:
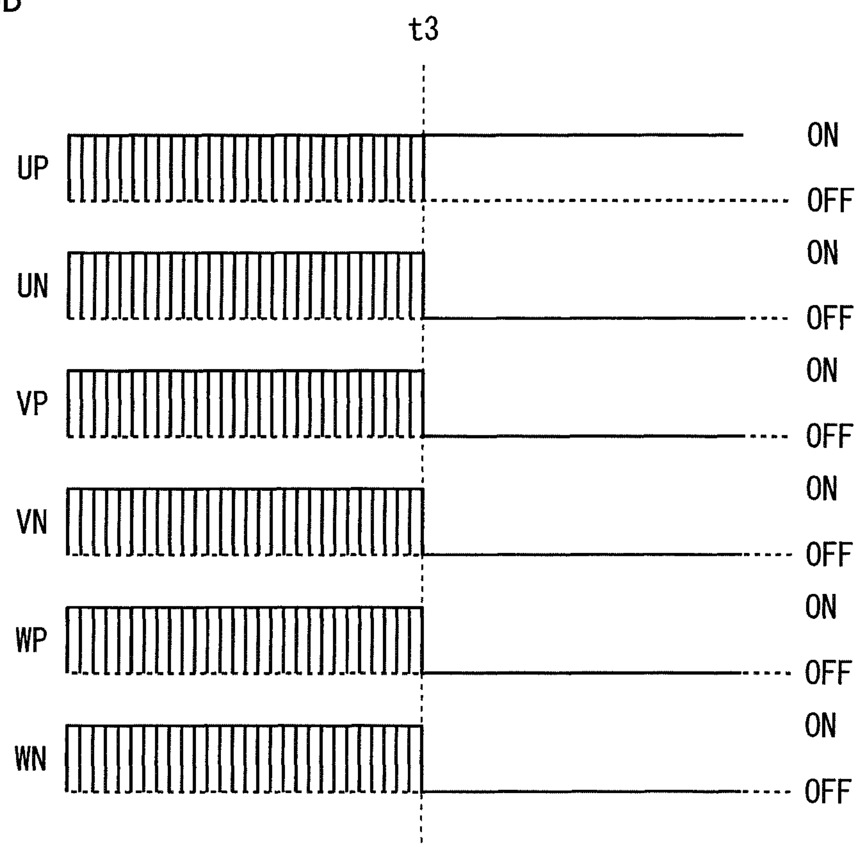
Figure 7A:
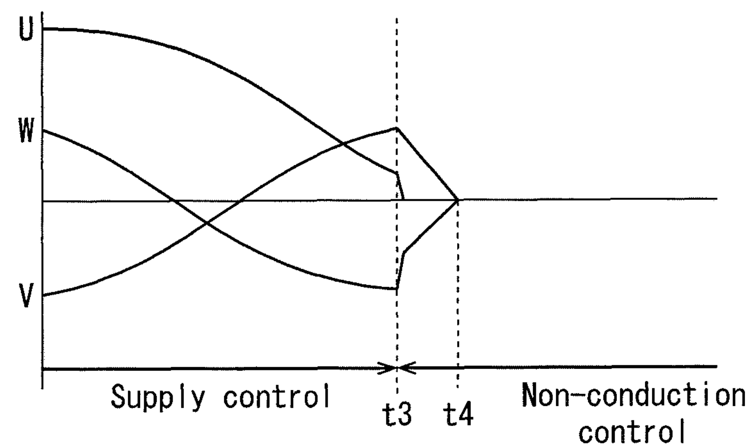
FIG. 7A is a waveform diagram illustrating a chronological change in motor current waveforms when all switching elements are put in the non-conduction state in the comparative example, and FIG. 7B indicates signals output to the switching elements for yielding the waveforms in FIG. 7A.
Figure 7B:
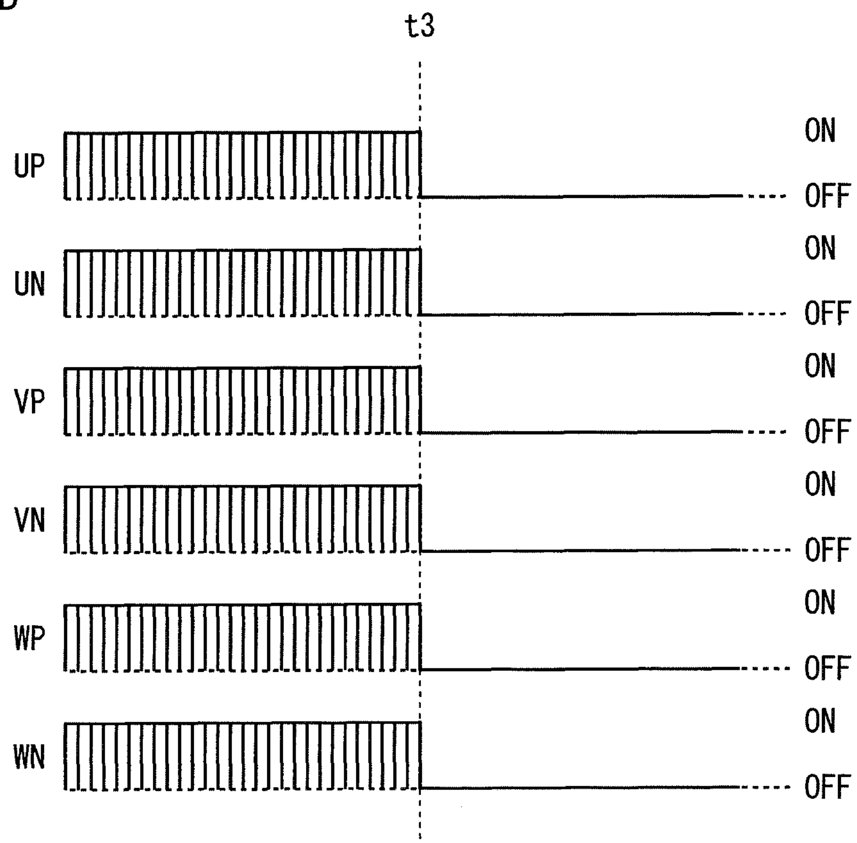
Figure 8A:
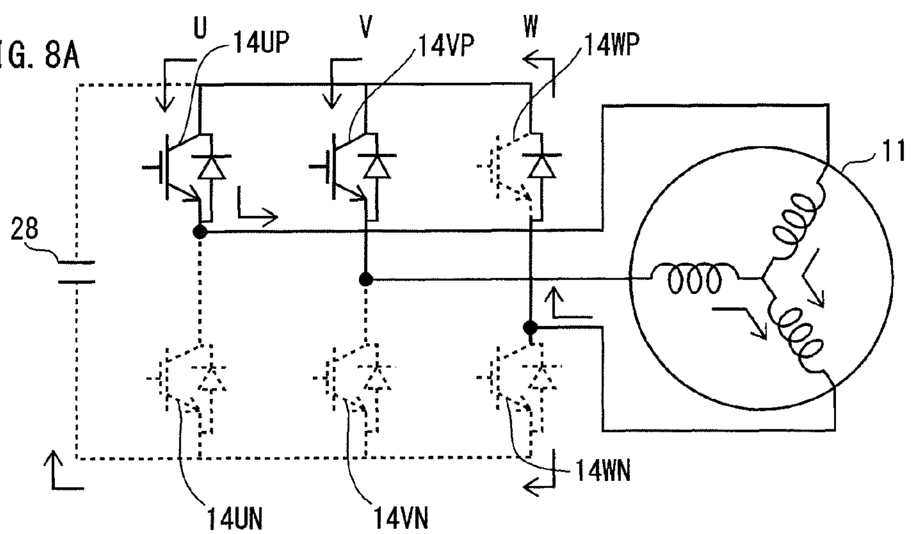
FIG. 8A is a circuit diagram illustrating a conduction state of the inverter when switching elements of upper arms corresponding to two phases are put in the conduction state in the embodiment.
Figure 8B:
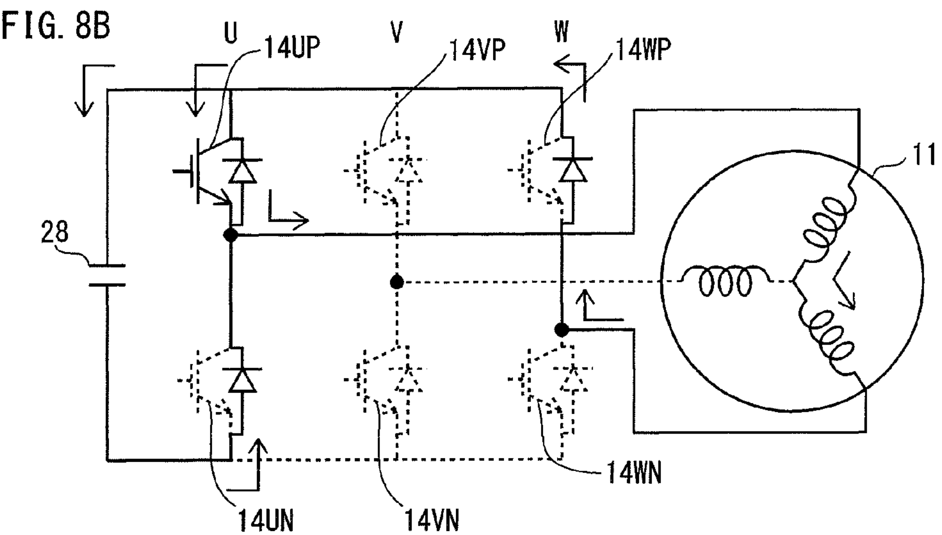
FIG. 8B is a circuit diagram illustrating a conduction state of the inverter when a switching element of an upper arm corresponding to one phase is put in the conduction state in the embodiment.
Figure 8C:
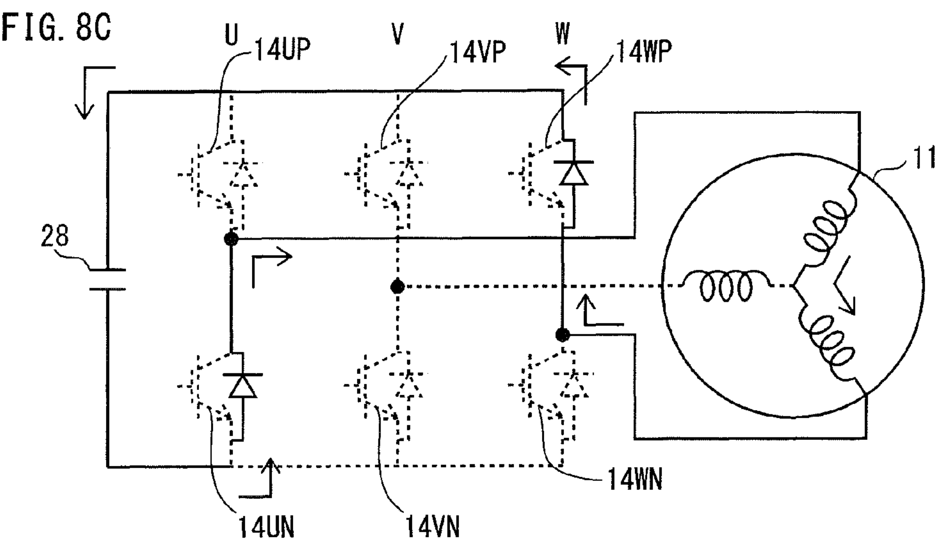
FIG. 8C is a circuit diagram illustrating a conduction state of the inverter when all switching elements are put in the non-conduction state in the comparative example.

FIGS. 5A and 5B, FIGS. 6A and 6B, and FIGS. 7A and 7B are waveform diagrams each indicating a chronological change in the motor current waveforms. FIGS. 8A through 8C are circuit diagrams each illustrating a conduction state of the inverter 12. Further, a combination of FIG. 5A, FIG. 5B, and FIG. 8A corresponds to a case where two switching elements 14 of two upper arms corresponding to two phases among the three phases are put in the conduction state in the embodiment. Similarly, a combination of FIG. 6A, FIG. 6B, and FIG. 8B corresponds to a case where one switching element 14 of one upper arm corresponding to one phase among the three phases is put in the conduction state in the embodiment. Finally, a combination of FIG. 7A, FIG. 7B, and FIG. 8C corresponds to a case where all of the switching elements 14 are put in the non-conduction state in the comparative example.

In each of the cases, at time point t3, when switching from the supply control to the suspension control is performed, the current of the U-phase and the current of the V-phase are flowing in a direction entering the three-phase motor 11, whereas the current of the W-phase is flowing in a direction exiting the three-phase motor 11.

Figure 5A:
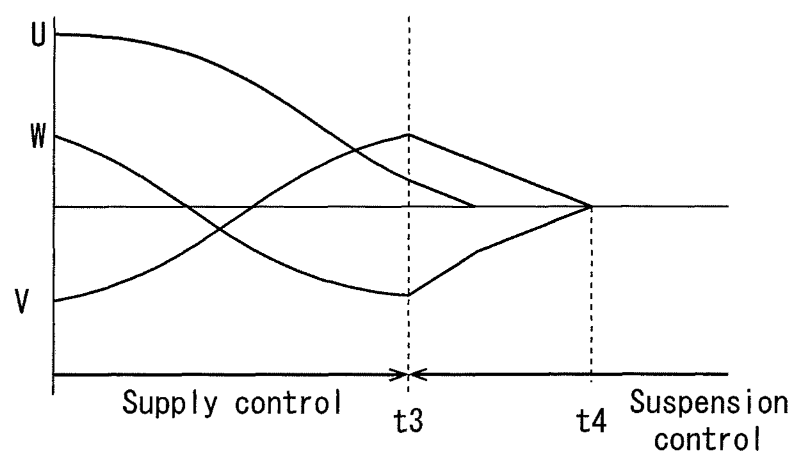
FIG. 5A is a waveform diagram illustrating a chronological change in motor current waveforms when switching elements of upper arms corresponding to two phases are put in a conduction state in the embodiment, and FIG. 5B indicates signals output to switching elements for yielding the waveforms in FIG. 5A.
Figure 5B:
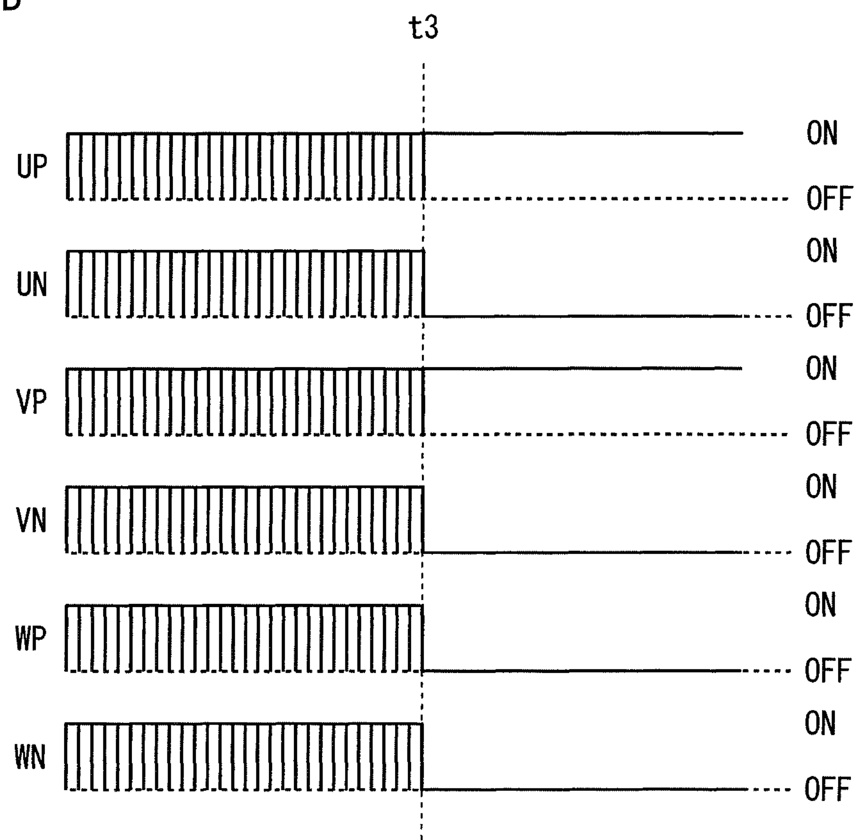

In the case illustrated in FIG. 8A, at the timing at which switching from the supply control to the suspension control is performed, the switching elements 14UP of the U-phase upper arm and the switching element 14VP of the V-phase upper arm are put and kept in the conduction state, while the rest of the switching elements 14, namely the switching elements 14WP, 14UN, 14VN, and 14WN, are put in the non-conduction state. As for the specific control to be performed in this case, as illustrated in FIG. 5B, an ON signal and an OFF signal are repeatedly output in alternation to each of the switching elements 14 until time point t3. Subsequently, from time point t3, an ON signal is output to each of the switching elements 14UP and 14VP, whereas an OFF signal is output to each of the switching elements 14UN, 14VN, 14WP, and 14WN. Due to this, first, the current of the U-phase equals 0 A, and subsequently, the current of the V-phase and the W-phase equal 0 A simultaneously, as illustrated in FIG. 5A.

In the case illustrated in FIG. 8B, at the timing at which switching from the supply control to the suspension control is performed, the switching element 14UP of the U-phase upper arm is put and kept in the conduction state, while the rest of the switching elements 14, namely the switching elements 14VP, 14WP, 14UN, 14VN, and 14WN, are put in the non-conduction state. As for the specific control to be performed in this case, as illustrated in FIG. 6B, an ON signal and an OFF signal are repeatedly output in alternation to each of the switching elements 14 until time point t3. Subsequently, from time point t3, an ON signal is output to the switching element 14UP, whereas an OFF signal is output to each of the switching elements 14UN, 14VP, 14VN, 14WP, and 14WN. Due to this, first, the current of the U-phase equals 0 A, and subsequently, the current of the V-phase and the W-phase equal 0 A simultaneously, as illustrated in FIG. 6A.

In the case illustrated in FIG. 8B, at the timing at which switching from the supply control to the non-conduction control is performed, all of the switching elements 14 are put in the non-conduction state. As for the specific control to be performed in this case, as illustrated in FIG. 7B, an ON signal and an OFF signal are repeatedly output in alternation to each of the switching elements 14 until time point t3. Subsequently, from time point t3, an OFF signal is output to each of the switching elements 14. Due to this, first, the current of the U-phase equals 0 A, and subsequently, the current of the V-phase and the W-phase equal 0 A simultaneously, as illustrated in FIG. 7A.

In the cases described above, the interval between time point t3 and time point t4, when the current of all three phases equal 0 A, decreases in the order of: (i) the case where two switching elements of two upper arms corresponding to two phases among the three phases are put in the conduction state at time point t3; (ii) the case where one switching element of one upper arm corresponding to one phase among the three phases is put in the conduction state at time point t3; and (iii) the case where all of the switching elements are put in the non-conduction state at time point t3.

Figures 9A, 9B:
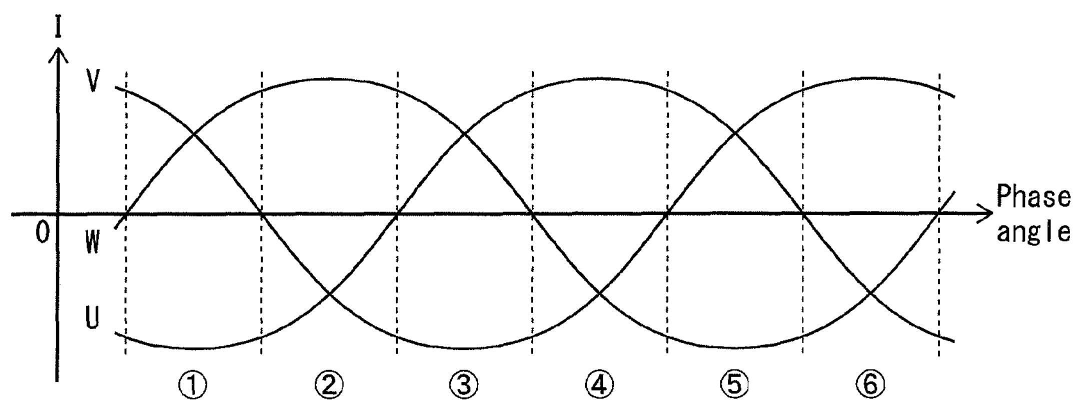
FIG. 9A is a waveform diagram indicating current waveforms within sections obtained by dividing a rotation phase angle of a motor into 60° sections.
FIG. 9B is a diagram indicating a correlation between the sections and switching elements put in the conduction state.

In the above, description has been provided on cases where switching between controls is performed at a time point at which currents of the U-phase and the V-phase indicate positive values. However, the present embodiment is not limited to this. FIG. 9A is a diagram indicating sections obtained by dividing the rotation phase angle of the three-phase motor 11 into 60° sections, and FIG. 9B is a diagram indicating switching elements 14 put in the conduction state within each of the sections. The sections 1 through 6 in FIG. 9A correspond to the sections 1 through 6 in FIG. 9B. Section 1 corresponds to a rotation phase angle range of equal to or greater than 0° and smaller than 60°, section 2 corresponds to a rotation phase angle range of equal to or greater than 60° and smaller than 120°, and so on. Further, in FIG. 9B, a switching element provided with an indication of "ON" is a switching element that can be put in the conduction state within the corresponding section. For instance, when the timing at which the supply of three-phase alternating current to the three-phase motor 11 is suspended is included in section 1, at least one of the switching element 14VP of the V-phase upper arm and the switching element 14WP of the W-phase upper arm is put in the conduction state, and the rest of the switching elements, namely the switching elements 14UP, 14UN, 14VN, and 14WN, are put in the non-conduction state. Here, note that the rotation phase angle of the three-phase motor 11 at time point t1 illustrated in FIG. 2A is 240°, and therefore, is included in section 5. As description has been provided up to this point, when a current of one phase among the three phases is 0 A, one switching element of an upper arm corresponding to a phase through which a current indicating a positive value flows is put in the conduction state, and the rest of the switching elements are put in the non-conduction state. In addition, the rotation phase angle at time point t3 illustrated in FIG. 2B is around 290°, and therefore, is included in section 5.

4. Effects

As description has been provided up to this point, the control unit 13 performs the suspension control of putting, in the conduction state, a switching element 14 of an upper arm corresponding to a phase of the three-phase motor 11 into which current flows upon suspension of the supply of current to the three-phase motor 11 and putting, in the non-conduction state, the rest of the switching elements 14. When the suspension control is performed, the three-phase motor 11 is put in the weak regenerative state. As such, the motor drive system 1 is provided, which, even when causing the three-phase motor 11 to generate torque intermittently such that the torque generated changes at a low frequency, reduces the risk of noise being generated by the capacitor 28 at the same time as reducing the risk of a drive system vibrating.

Vibration of the drive system can be suppressed since, when current flowing into the capacitor 28 provided to the inverter 12 is reduced and the rapid regeneration of current is thereby suppressed, the vibration of the capacitor 28 is suppressed. As such, even when the frequency at which the capacitor 28 vibrates and the frequency at which the drive system vibrates approach each other, the risk of vibration of the drive system being amplified is reduced, and accordingly, the risk of the drive system vibrating is reduced.

In addition, as description has been provided above, selection can be made between the two regenerative states of the three-phase motor 11 having different levels of strength by switching from the supply control to either the suspension control or the non-conduction control. As such, the vibration caused by the three-phase motor 11 braking for being in the generative state can be suppressed The "braking" as referred to here is caused when the current flowing out from the three-phase motor 11 is collected by the capacitor 28. More specifically, "braking" takes place by the three-phase motor 11 being put in the regenerative state while current continues to flow out from the three-phase motor 11.

Modifications

1. Selective Switching from Supply Control to Suspension Control or Non-Conduction Control In the embodiment, description has been provided on specific operations of the motor drive system 1 when switching is performed from the supply control to the suspension control. In the present modification, description is provided on operations of the motor drive system 1 when switching is performed on a selective basis from the supply control to either the suspension control or the non-conduction control. During the suspension control, the three-phase motor 11 is in the weak regenerative state. Therefore, while generation of vibration is suppressed, current collected by the capacitor 28 is basically zero. In contrast, during the non-conduction control, the three-phase motor 11 is continuously in the strong regenerative state. Therefore, while the generation of vibration is not suppressed, relatively great current is collected by the capacitor 28. In view of this, by enabling selection of either the suspension control and the non-conduction control, control can be performed by providing more priority to a desired one of (i) the suppression of the generation of vibration and (ii) the collection of power, depending upon the situation. In the following, description is provided on a case where either the rotation speed of the three-phase motor 11 or the current flowing out from the three-phase motor 11 is used as the criterion for determining which of the supply control and the suspension control is to be selected as control to be performed following the supply control.

1-1. Rotation Speed of Motor

In the following, description is provided on a modification where the rotation speed of the three-phase motor 11 is used for determining a condition to be satisfied for switching from the supply control to the non-conduction control.

Generally, the energy collected by the capacitor 28, in a case where all of the switching elements 14 are put in the non-conduction state and the current flowing out from the three-phase motor 11 is completely collected by the capacitor 28, is dependent upon a value of the current flowing out from the three-phase motor 11 and arriving at the capacitor 28. This is since the energy collected by the capacitor 28 is part of kinetic energy generated by the three-phase motor 11. The energy collected by the capacitor 28 is not dependent upon the rotation speed of the three-phase motor 11. In the meantime, when the rotation speed of the three-phase motor 11 is high, the kinetic energy of the three-phase motor 11 is great.

Here, comparison is made between two cases where the value of the current flowing out from the three-phase motor 11 is similar but the rotation speed of the three-phase motor 11 differs. In a case where the rotation speed of the three-phase motor 11 is relatively low, the kinetic energy originally possessed by the three-phase motor 11 is relatively small, and the ratio of the energy collected by the capacitor 28 to the kinetic energy originally possessed by the three-phase motor 11 is relatively great. Due to this, a great proportion of the rotational force generated by the three-phase motor 11 is lost by energy being collected by the capacitor 28. On the other hand, in a case where the rotation speed of the three-phase motor 11 is relatively high, the proportion of the rotational force lost by energy being collected by the capacitor 28 is relatively small even when the capacitor 28 collects the same amount of energy as in the case where the rotation speed of the three-phase motor 11 is relatively low. As such, in the case where the rotation speed of the three-phase motor 11 is relatively low, the change in rotation speed brought about by the regeneration of current and the resultant regenerative state of the three-phase motor 11 is relatively great, and accordingly, the vibration generated when the switching from the supply control to the non-conduction control is performed is relatively great. On the other hand, in the case where the rotation speed of the three-phase motor 11 is relatively high, the change in rotation speed brought about by the regeneration of current and the resultant regenerative state of the three-phase motor 11 is relatively small, and accordingly, the vibration generated when the switching from the supply control to the non-conduction control is performed is relatively small.

As such, a predetermined value of the rotation speed of the three-phase motor 11 may be determined in accordance with the level of the vibration generated. By making such a modification and performing the switching to the non-conduction state when the rotation speed of the three-phase motor 11 is higher than the predetermined value, energy loss can be suppressed by causing the capacitor 28 to collect energy. On the other hand, by performing the switching to the suspension state when the rotation speed of the three-phase motor 11 is lower than the predetermined value, the generation of vibration can be suppressed.

1-2. Current Flowing Out from Motor

In the following, description is provided on a modification where the value of the current flowing out from the three-phase motor 11 is used for determining the condition to be satisfied for switching from the supply control to the non-conduction control.

The energy collected by the capacitor 28 is proportional to the value of the current flowing out from the three-phase motor 11. Therefore, the kinetic energy lost by energy being collected by the capacitor 28 is dependent upon the magnitude of the current flowing out from the three-phase motor 11. As such, a modification may be made of selecting whether to switch to the suspension control or the non-conduction control according to the magnitude of the current flowing out from the three-phase motor 11.

More specifically, when the value of the current flowing out from the three-phase motor 11 is relatively small, the decrease in kinetic energy is small and the vibration generated is small since the energy collected by the capacitor 28 is relatively small. As such, a modification may be made of setting a predetermined value of the value of the current flowing out from the three-phase motor 11 and switching to the non-conduction control when the current flowing out from the three-phase motor 11 is smaller than the predetermined value. On the other hand, when the current flowing out from the three-phase motor 11 is relatively great, the decrease in kinetic energy is great and the vibration generated is great since the energy collected by the capacitor 28 is relatively great. As such, a modification may be made such that switching to the suspension control is performed when the current flowing out from the three-phase motor 11 is greater than the predetermined value.

2. Switching from Supply Control to Suspension Control, and then to Non-Conduction Control In the embodiment, description has been provided on specific operations of the motor drive system 1 when switching is performed from the supply control to the suspension control. In the case described in the embodiment, the current flowing out from the three-phase motor 11 is not collected during the suspension control. In contrast, in the present modification, switching is first performed from the supply control to the suspension control, and then, after elapse of a predetermined amount of time, switching is performed to the non-conduction control. By switching to the non-conduction control following the elapse of the predetermined amount of time from the switching from the supply control to the suspension control, a portion of the current flowing out from the three-phase motor 11 is collected by the capacitor 28. Note that here, the predetermined amount of time is set such that, as a result of the elapse of the predetermined amount of time, the current flowing out from the three-phase motor 11 decreases but does not reach zero. By making such a modification, a motor drive system is provided that suppresses energy loss during the non-conduction control while suppressing the generation of vibration during the suspension control.

In the embodiment and the modifications described above, the detection of the rotation phase angle and the rotation speed of the three-phase motor 11 is performed by utilizing a motor sensor. However, the present invention is not limited to this. That is, for instance, a so-called sensor-less control method may be applied, where estimation of the rotation phase angle and the rotation speed of the three-phase motor 11 is performed by utilizing the current flowing out from the three-phase motor 11 and parameters of the three-phase motor 11. In addition, the detection of the motor currents is performed at the two current detection sensors 29 and 30 in FIG. 1. However, the present invention is not limited to this. For instance, there exists a practically-applied method where currents flowing through the three-phase motor 11 are detected by connecting a resistor having low resistance, or that is, a so-called shunt resistor, between the inverter 12 and the power source 10, and by detecting the voltage applied to the resistor along with the state of the inverter 12 under PWM control. In view of such a method, a shunt resistor may be utilized for the detection of currents flowing through the three-phase motor 11 in the present invention. Further, in the present invention, voltage control is performed by performing dq conversion on the motor currents having been detected and by determining errors between the d-axis and q-axis current values and the d-axis and q-axis current command values, respectively. However, the present invention is not limited to this. That is, any control method may be utilized as long as the motor generates and outputs the demanded torque in accordance with the torque command value. In other words, any control method may be utilized provided that a feedback control loop is formed such that the motor currents are in accordance with the current command values. This is since the torque command value is substantially proportional to the current command values.

INDUSTRIAL APPLICABILITY

The motor drive system pertaining to the present invention has a wide range of possible applications including, for instance, inverter control of a compressor of an air conditioning unit, inverter control of a refrigerator, inverter control of an air to water heat pump, inverter control of an industrial servo amp, and inverter control of electric and hybrid vehicles.

REFERENCE SIGNS LIST

11 three-phase motor
12 inverter
13 control unit
14 switching element
21 PWM signal generation unit
22 all-OFF signal generation unit
23 specification signal generation unit
24 selector
26 time-division control unit

The invention claimed is:

1. A motor drive system comprising:

an inverter that supplies power to a three-phase motor by supplying alternating current to three phases of the three-phase motor, the inverter including at least three upper arms and at least three lower arms, each of the at least three upper arms and each of the at least three lower arms including a switching element and a freewheeling diode that are connected in parallel; and a control unit that performs control of the switching elements included in the inverter by switching between (i) supply control of controlling the switching elements so as to cause the inverter to supply alternating current to the three phases and (ii) suspension control of controlling the switching elements so as to cause the inverter to stop the supply of alternating current to the three phases, wherein the control unit switches from the supply control to the suspension control at a timing at which the supply of alternating current to the three phases is to be stopped, and the suspension control is control of:

putting and keeping, in a conduction state, a switching element of at least one upper arm, among the at least three upper arms, each corresponding to one of one or more phases through which alternating current flows in a direction entering the three-phase motor at the timing at which the supply of alternating current to the three phases is to be stopped, and putting and keeping the rest of the switching elements included in the inverter in a non-conduction state.

2. The motor drive system of claim 1 further comprising a rotation speed detection unit that detects a rotation speed of the three-phase motor, wherein when the rotation speed is lower than a predetermined value at the timing at which the supply of alternating current to the three phases is to be stopped, the control unit switches from the supply control to the suspension control, and when the rotation speed is higher than or equal to the predetermined value at the timing at which the supply of alternating current to the three phases is to be stopped, the control unit switches from the supply control to control of putting the switching elements included in the inverter in the non-conduction state.

3. The motor drive system of claim 1 further comprising a current detection unit that detects an electric current value for alternating current flowing through the three phases, wherein when the electric current value is smaller than a predetermined value at the timing at which the supply of alternating current to the three phases is to be stopped, the control unit switches from the supply control to control of putting the switching elements included in the inverter in the non-conduction state, and when the electric current value is greater than or equal to the predetermined value at the timing at which the supply of alternating current to the three phases is to be stopped, the control unit switches from the supply control to the suspension control.

4. The motor drive system of claim 1 further comprising a current detection unit that detects an electric current value for alternating current flowing through the three phases, wherein at a timing at which the electric current value falls below a predetermined value following switching from the supply control to the suspension control, the control unit switches from the suspension control to control of putting the switching elements in the non-conduction state.

5. The motor drive system of claim 1, wherein at a timing at which a predetermined interval elapses following switching from the supply control to the suspension control, the control unit switches from the suspension control to control of putting the switching elements in the non-conduction state.

6. The motor drive system of claim 1, wherein the control unit performs the suspension control such that, when alternating current flows through two phases, among the three phases, in the direction entering the three phase motor at the timing at which the supply of alternating current to the three phases is to be stopped, a switching element of each of two upper arms, among the at least three upper arms, corresponding to the two phases is put and kept in the conduction state and the rest of the switching elements included in the inverter are put in the non-conduction state.

7. The motor drive system of claim 1, wherein the control unit performs the suspension control such that, when alternating current flows through two phases, among the three phases, in the direction entering the three phase motor at the timing at which the supply of alternating current to the three phases is to be stopped, a switching element of one upper arm, among the at least three upper arms, corresponding to one of the two phases is put and kept in the conduction state and the rest of the switching elements included in the inverter are put in the non-conduction state.

8. A method for driving an inverter that supplies power to a three-phase motor by supplying alternating current to three phases of the three-phase motor, the inverter including at least three upper arms and at least three lower arms, each of the at least three upper arms and each of the at least three lower arms including a switching element and a freewheeling diode that are connected in parallel, the method comprising performing control of the switching elements included in the inverter by switching between (i) supply control of controlling the switching elements so as to cause the inverter to supply alternating current to the three phases and (ii) suspension control of controlling the switching elements so as to cause the inverter to stop the supply of alternating current to the three phases, wherein switching from the supply control to the suspension control is performed at a timing at which the supply of alternating current to the three phases is to be stopped, and the suspension control is control of:

putting and keeping, in a conduction state, a switching element of at least one upper arm, among the at least three upper arms, each corresponding to one of one or more phases through which alternating current flows in a direction entering the three-phase motor at the timing at which the supply of alternating current to the three phases is to be stopped, and putting and keeping the rest of the switching elements included in the inverter in a non-conduction state.

* * * * *